United States Patent
Ehrke et al.

(10) Patent No.: US 9,970,580 B2
(45) Date of Patent: May 15, 2018

(54) BACKLASH-FREE PLUG-IN CONNECTION FOR PIPE LINES AND HOSE LINES

(71) Applicant: PARKER HANNIFIN MANUFACTURING GERMANY GMBH & CO. KG, Bielefeld (DE)

(72) Inventors: Dieter Ehrke, Bielefeld (DE); Udo Hunkenschroeder, Bielefeld (DE)

(73) Assignee: PARKER HANNIFIN MANUFACTURING GERMANY GMBH & CO. KG, Bielefeld (DE)

( * ) Notice: Subject to any disclaimer, the term of this patent is extended or adjusted under 35 U.S.C. 154(b) by 7 days.

(21) Appl. No.: 15/110,115

(22) PCT Filed: Jan. 15, 2015

(86) PCT No.: PCT/EP2015/050661
§ 371 (c)(1),
(2) Date: Jul. 7, 2016

(87) PCT Pub. No.: WO2015/110342
PCT Pub. Date: Jul. 30, 2015

(65) Prior Publication Data
US 2016/0334040 A1    Nov. 17, 2016

(30) Foreign Application Priority Data

Jan. 23, 2014   (DE) .................. 10 2014 100 758

(51) Int. Cl.
*F16L 37/088* (2006.01)
*F16L 19/02* (2006.01)

(52) U.S. Cl.
CPC ......... *F16L 37/088* (2013.01); *F16L 19/0231* (2013.01)

(58) Field of Classification Search
CPC .................................................... F16L 37/088
(Continued)

(56) References Cited

U.S. PATENT DOCUMENTS

| 4,063,760 A | 12/1977 | Moreiras |
| 2005/0167976 A1 | 8/2005 | Le Quere et al. |

(Continued)

FOREIGN PATENT DOCUMENTS

| CN | 201651629 U | 11/2010 |
| DE | 27 48 157 A1 | 5/1978 |

(Continued)

OTHER PUBLICATIONS

International Search Report and Written Opinion for corresponding Patent Application No. PCT/EP2015/050661 dated Mar. 24, 2015.
(Continued)

*Primary Examiner* — Aaron M Dunwoody
(74) *Attorney, Agent, or Firm* — Renner, Otto, Boisselle & Sklar, LLP

(57) ABSTRACT

A backlash-free plug-in connection for a pipe or hose line includes a threaded-connection body, a union nut, a pipe piece insertable into the threaded-connection body, and a securing ring supported against the pipe piece. Stepped recesses are provided for holding the securing ring. A gasket seals the pipe piece against the threaded-connection body. By pressurizing a medium flowing through the pipe or hose line, the pipe piece moves from an inserted position against an insertion direction to a locked position. A fixing ring abuts the securing ring and the gasket, and is supported between the pipe piece and a contact surface formed on the threaded-connection body or union nut. The contact surface is inclined and the gasket moves the fixing ring to a fixed position when the pipe piece moves to the locked position so that the pipe piece is fixed in place.

15 Claims, 4 Drawing Sheets

(58) Field of Classification Search
USPC .................. 285/307, 608, 309, 310, 321
See application file for complete search history.

(56) References Cited

U.S. PATENT DOCUMENTS

2007/0052237 A1* 3/2007 Udhofer .............. F16L 19/0231
285/387
2008/0136178 A1* 6/2008 Udhofer .............. F16L 19/0231
285/337

FOREIGN PATENT DOCUMENTS

| | | |
|---|---|---|
| DE | 10 2004 035 354 B3 | 2/2006 |
| DE | 20 2006 008916 U1 | 8/2006 |
| DE | 10 2009 022859 A1 | 12/2010 |
| EP | 1 561 988 A1 | 8/2005 |
| EP | 2159466 A2 | 3/2010 |
| JP | S51-015890 B | 5/1976 |
| JP | S63-198889 U | 12/1988 |
| JP | H04-058690 U | 5/1992 |
| WO | WO 2012/163951 A1 | 12/2012 |

OTHER PUBLICATIONS

Chinese Search Report for corresponding Patent Application No. CN106104133 dated Apr. 25, 2017.
Notification of Refusal for corresponding Japanese Patent Application No. 2016-548183 dated Jan. 16, 2018.

* cited by examiner

BACKLASH-FREE PLUG-IN CONNECTION FOR PIPE LINES AND HOSE LINES

FIELD OF THE INVENTION

The present invention relates to a plug-in connection for pipe lines or hose lines comprising a threaded-connection body exhibiting a borehole for relaying a medium flowing through the pipe line or hose line, and with a union nut screwed onto the threaded-connection body for the locked retention of a pipe piece inserted into the threaded-connection body by means of a securing ring that is supported against a retaining surface arranged on the pipe piece, and is located in a chamber bounded by the union nut, threaded-connection body and pipe piece, wherein a floor surface of the chamber allocated to the securing ring incorporates a stepped recess for holding the securing ring, comprised of a first step situated adjacent to the chamber and set up to accommodate the securing ring during insertion of the pipe piece, and a second step adjoining the latter that secures the securing ring so that it abuts against the retaining surface of the inserted pipe piece, wherein the chamber further incorporates a gasket that seals the inserted pipe piece against the threaded-connection body, and the pipe piece can be transferred by pressurizing the medium from its inserted position against the insertion direction relative to the threaded-connection body, into its locked position, in which the securing ring lies in the second step of the recess.

BACKGROUND OF THE INVENTION

A plug-in connection with the aforementioned features is described in DE 10 2004 035 354 B3. The known plug-in connection is based on the locking principle, in which on the one hand a resiliently expandable securing ring is arranged in a chamber formed in a union nut tightly screwed onto the threaded-connection body joined with a first pipe or forming a constituent thereof, and on the other hand a pipe piece in the form of a second pipe with a bead formed thereon by deforming its pipe wall can be inserted into the chamber of the union nut or adjoining threaded-connection body, and locked therein by means of the securing ring. During insertion of the pipe piece, the bead expands the resiliently designed securing ring, until the latter catches behind the locking surface formed by the bead upon reaching the connecting position of the threaded-connection body and pipe piece. To enable this radial movement by the securing ring, the floor surface of the chamber allocated to the securing ring has formed in it a stepped recess for accommodating the securing ring, which consists of a first step situated adjacent to the chamber and set up to accommodate the securing ring during insertion of the pipe piece, and a second step adjoining the latter that secures the securing ring so as to abut against the inserted pipe piece and lock it in place. Due to the allocation of these two steps of the recess, the known plug-in connection does not provide for a rotation of the union nut on the threaded-connection body with the pipe piece inserted.

Another disadvantage associated with such a plug-in connection is that the securing ring abuts against the transitional corner between the first recess step and second recess step in the initially unloaded inserted position of the pipe piece in the threaded-connection body. Only when the plug-in connection is exposed to pressure or placed under tensile load the securing ring is drawn completely into the second recess step, and fixed in place therein by the position of the union nut on the threaded-connection body. As a result, a certain axial backlash of the pipe piece with the locking surface is present relative to the threaded-connection body with union nut given variable pressures, and in particular given an unpressurized plug-in connection. Given exposure to a dynamic pressure or vibrations acting on the plug-in connection, this axial backlash leads to corresponding axial movements of the components relative to each other, and hence to wear, resulting in a lower service life for the plug-in connection.

SUMMARY OF THE INVENTION

Therefore, the object of the invention is to further develop a plug-in connection with the generic features in such a way as to preclude a relative movement of components in the plug-in connection in relation to each other both when under a dynamic pressure and unpressurized, as well as when exposed to vibrations.

This object is achieved by a plug-in connection showing the features in the independent claim. Advantageous embodiments of the plug-in connection are indicated in the dependent claims and specification, wherein features of these advantageous embodiments can be combined with each other in any technologically reasonable way.

In particular, the object is achieved by a fixing ring that is situated in the chamber between the securing ring and gasket, and is supported between the inserted pipe piece and a contact surface formed on the threaded-connection body and/or union nut and inclined with an axial progression in the direction of the securing ring relative to the longitudinal axis of the pipe piece, wherein the contact surface is given an inclination in which the fixing ring displaced into its fixed position by the pressurized gasket with the pipe piece in a locked position is clamped in a self-locking manner in the chamber, so that the pipe piece is fixed in place backlash-free. The backlash-free fixation here acts in both an axial and radial direction, as well as when exposed to varying pressures and unpressurized. The fixing ring is preferably in abutment with the gasket and securing ring.

When exposing the plug-in connection to pressure for the first time with the pressurized medium, the pipe piece with the securing ring is thus axially displaced into its locked position, so that the production- and function-related spaces cause the medium exiting the front of the pipe piece to abut against the gasket, which in turn is in contact with the fixing ring. The pressure of the medium pushes the gasket with the fixing ring into the fixed position. The magnitude of the force that here acts on the fixing ring depends on the operating pressure of the medium, and on the size of the gasket. As a consequence, an optimal force can be set over the size of the selected gasket. In addition, the fixation for the fixing ring can be selected by the choice of material for the fixing ring. Fixation sets in at low forces for soft materials, and at high forces for hard materials. The fixing ring preferably consists of a high-strength plastic.

According to the invention, the contact surface can be formed on the union nut or threaded-connection body, wherein the threaded-connection body can also be regarded as including an intermediate ring that is situated in the chamber and supported between the threaded-connection body and union nut, and can also function as an adapter or so as to adjust the threaded-connection body to various pipe pieces. The contact surface must be inclined relative to the longitudinal axis in such a way that even self-locking can arise. Self-locking means that the fixing ring cannot get back to the inserted position, even given an unpressurized state. This also yields the critical advantage of the present invention, because even in an unpressurized state, the fixing ring holds the pipe piece without backlash in particular in an axial direction, wherein the backlash-free locked position sets in without further activating the union nut or threaded-connection body. Therefore, the backlash-free locked position is achieved by exposing the medium to pressure one time. The backlash-free locked position prevents parts of the plug-in connection and the pipe line or hose line from moving relative to each other.

According to the present invention, the pipe piece inserted into the plug-in connection is held in the locked position by the securing ring, and fixed in place without backlash by the fixing ring located in the fixed position.

It is preferred that the contact surface be inclined by an angle of less than 10° relative to a longitudinal axis of the pipe piece. As a rule, self-locking is almost always present at such a small angle between the contact surface and longitudinal axis.

According to an advantageous further development, the contact surface is formed in the union nut, wherein the axial boundary surface of the first step of the recess is preferably inclined against the insertion direction, thereby forming the contact surface. For example, the contact surface can be exclusively formed on the union nut.

Alternatively, the contact surface is formed on an intermediate ring situated in the chamber or on a connection piece formed on the threaded-connection body. In particular, the contact surface is only formed on one of these elements. In the case that contact surfaces are formed both on the union nut and on the intermediate ring or connection piece, the fixing ring is clamped at several locations, thereby yielding a reliable fixation.

In order to retain the fixing ring in a predefined position when inserting the pipe piece into the threaded-connection body and apply an additional clamping force while pressurizing the medium, it is preferred that the fixing ring be Z-shaped in its axial cross section, so that it abuts in an axial direction against an intermediate ring situated in the chamber or against a connection piece formed on the threaded-connection body on the one hand, and abuts in an axial direction against a bead on the pipe piece on the other. In this context, it is also preferred that the fixing ring abut against a bead of the pipe piece in the inserted position and locked position.

In a further advantageous design of the plug-in connection, the fixing ring exhibits at least one slit aligned parallel to the longitudinal axis. The fixation effect of the fixing ring and its self-locking are here retained, since the latter depend mainly on the configuration of the contact surface angles. The fixing ring can exhibit one or more slits running at least partially in a longitudinal direction. For a fixing ring made out of plastic, it is preferred that the latter exhibit several slits running only partially in the fixing ring in a longitudinal direction. If the fixing ring consists of metal, such as brass or aluminum, it is preferred that precisely one slit be provided, which runs in the longitudinal direction completely through the fixing ring. Such a metal ring can intercept more vibration than a plastic ring.

BRIEF DESCRIPTION OF THE DRAWINGS

The present invention and the technical environment will be explained in greater detail based on the following figures, wherein it must be noted that, while the figures depict preferred embodiments of the invention, the latter is not limited thereto. Shown schematically on.

DETAILED DESCRIPTION OF THE INVENTION

Figure 1:
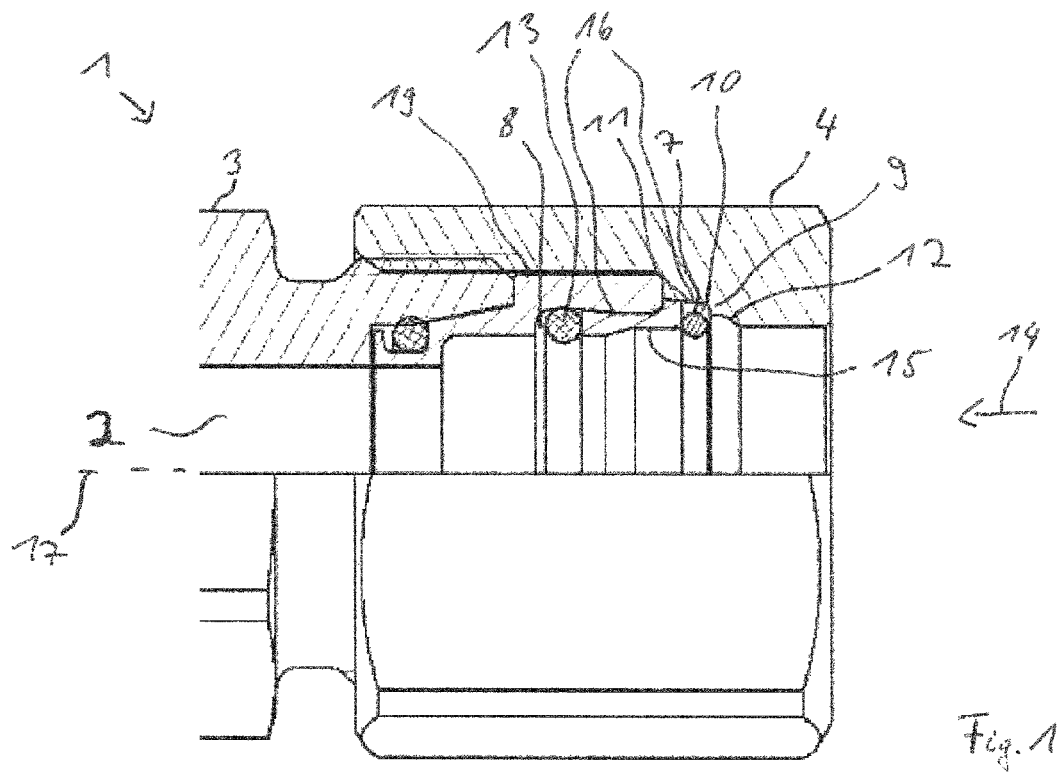
FIG. 1: is a plug-in connection according to the invention.
Figure 2:
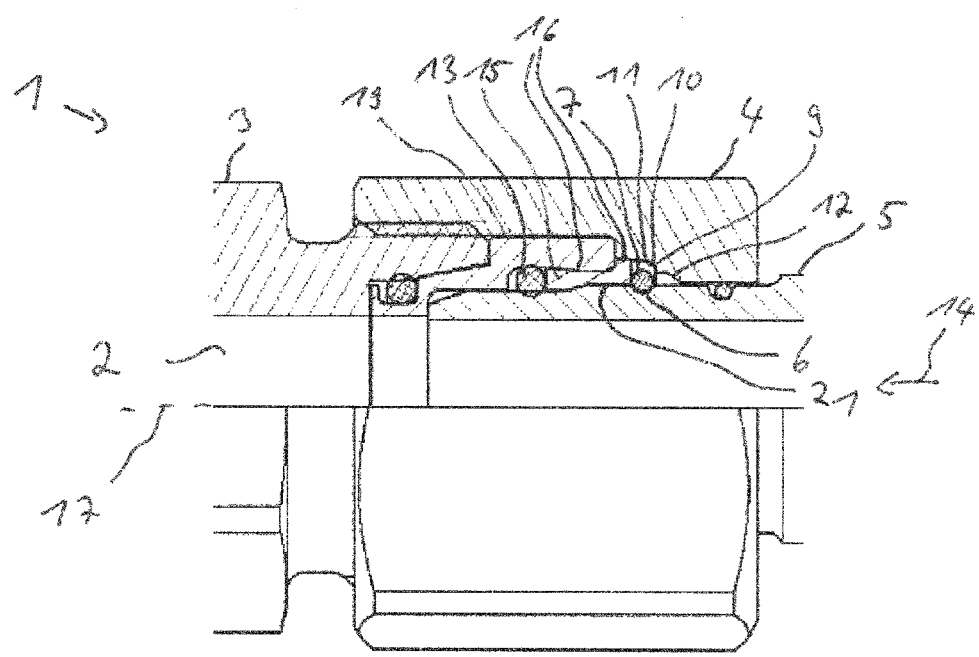
FIG. 2: is the plug-in connection with inserted pipe section.
Figure 3:
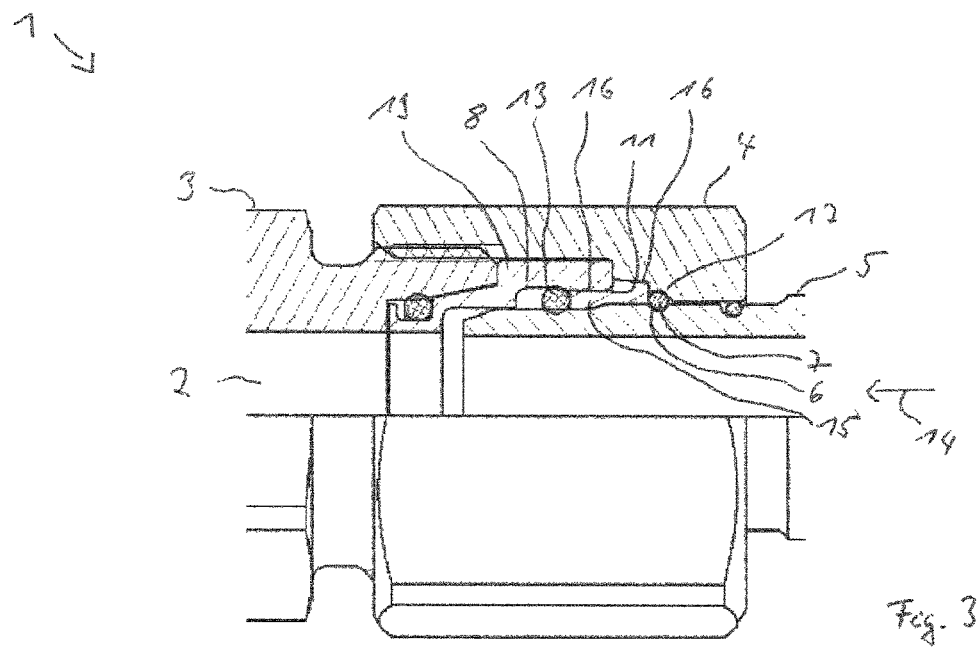
FIG. 3: is the plug-in connection in the locked position.
Figure 4:
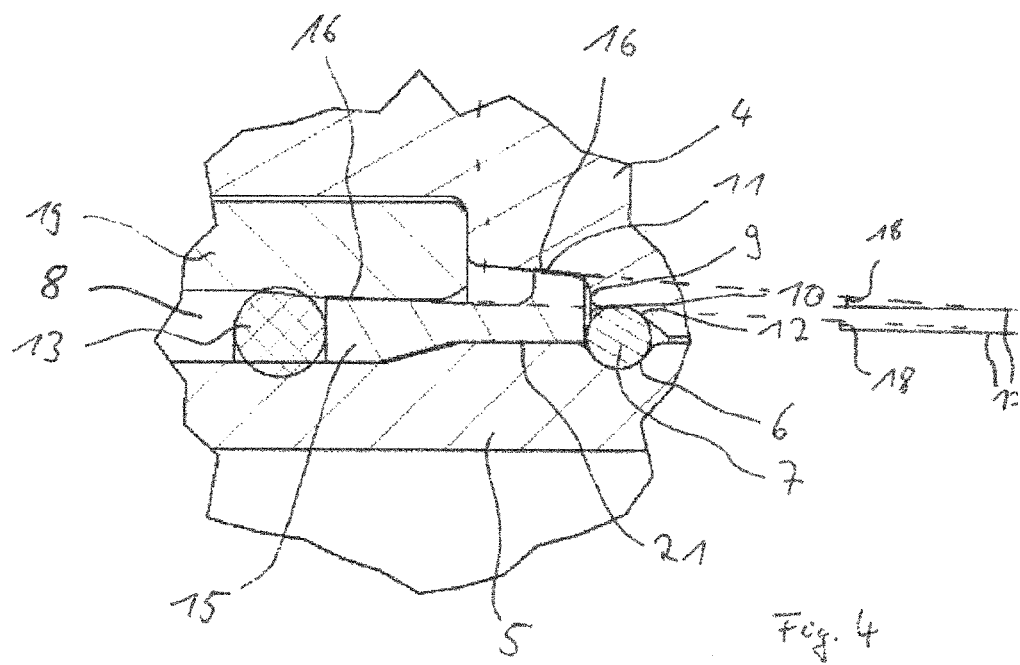
FIG. 4: is a detail of the plug-in connection in the locked position.

The plug-in connection 1 shown on FIGS. 1 to 4 consists of a threaded-connection body 3, whose screw neck provided with a corresponding male thread has screwed onto it a union nut 4 with a corresponding female thread. A borehole 2 is formed in the threaded-connection body 3. A pipe piece 5 can be inserted into the in this respect preassembled threaded-connection body 3 with union nut 4 screwed thereon (FIG. 2). The threaded-connection body 3, union nut 4 and pipe piece 5 form a chamber 8 in the plug-in connection 1. Situated in the chamber 8 in addition to a securing ring 7 is a fixing ring 15 that abuts against the securing ring 7. Also located in the chamber is an intermediate ring 19 that adjusts to the shape of the threaded-connection body 3. Further arranged in the chamber 8 is the gasket in the form of a sealing ring 13, which interacts with the insertion end of the pipe piece 5 so as to form a seal, and seals the pipe piece 5 against the intermediate ring 19.

A bead 21 projecting over the outer periphery of the insertion area is formed in the insertion area of the pipe piece 5, wherein a retaining surface 6 adjoins the bead 21 in the form of a groove. The pipe piece 5 exhibits a longitudinal axis 17 that conforms to the threaded-connection body 3 and union nut 4.

The outer periphery of the fixing ring 15 abuts against two contact surfaces 16. The one contact surface 16 is formed on the intermediate ring 19, and the other contact surface on the union nut 4. The contact surfaces are inclined at an angle 18 of less than 10° relative to the longitudinal axis 17. It would be sufficient in terms of the invention for the intermediate ring 19 to only abut against one of the contact surfaces 16.

The union nut 4 incorporates a two-step recess 10 for accommodating the securing ring 7 in an inserted position for the pipe piece 5 and in a locked position in proximity to a bottom surface 9 of the union nut 4, with a first step 11 and a second step 12. For assembling the pipe plug-in connection, the pipe piece 5 to be inserted is inserted into the unit comprised of the threaded-connection body 3 and union nut 4, wherein the securing ring 7 comes to abut against the retaining surface 6 in the inserted position, as evident from FIG. 2. In the illustration on FIG. 2, the securing ring 7 still lies in the first step 11 of the recess 10.

If the medium flowing in the pipe piece 5 is now exposed to a pressure, the pressure initially displaces the pipe piece 5 axially against the inserted direction 14, causing the resiliently expandable securing ring 7 to abut in the second step 12. As a consequence, the production- and function-related backlash now allows the pressurized medium to reach the sealing ring 13, which in turn displaces the fixing ring 15 against the inserted direction 14 while exposed to pressure. Since the contact surfaces 16 taper at an angle 18 against the inserted direction 14, the fixing ring 15 is now clamped between the contact surfaces 16 and pipe piece 5. The locked position and fixed position are depicted on FIG. 3, and magnified on FIG. 4.

Due to the inclination of the contact surfaces relative to the longitudinal axis 17, the fixing ring 15 lies between the contact surfaces 16 and pipe piece 5 in a self-locking manner, as a result of which the fixing ring 15 is also held backlash-free in the plug-in connection 1, even in an unpressurized state.

Figure 5:
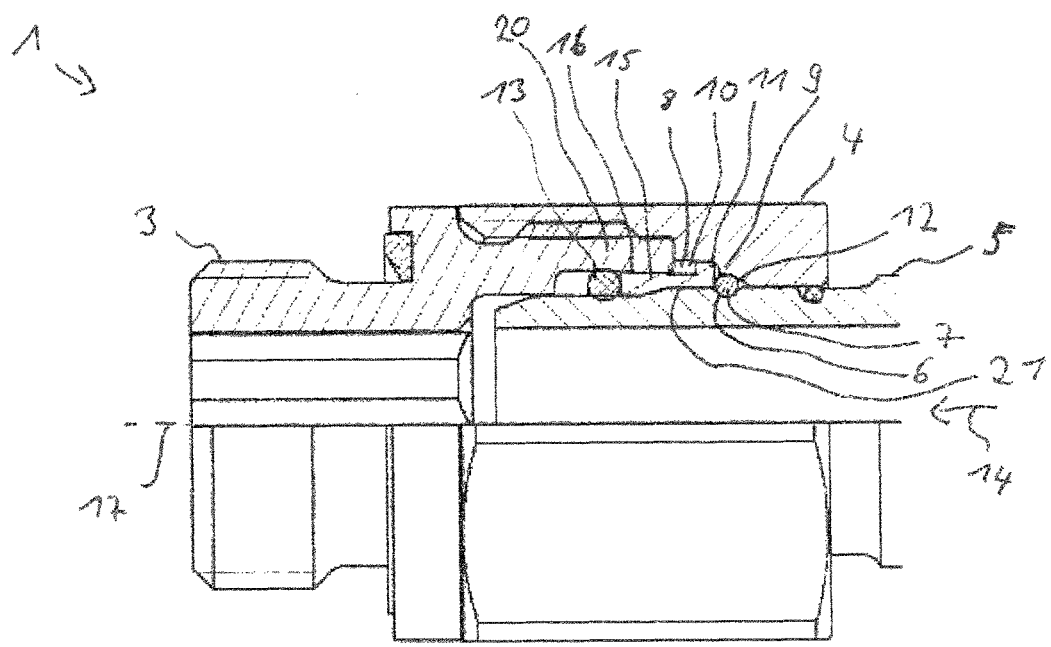
FIG. 5: is an additional embodiment of a plug-in connection according to the invention.

FIG. 5 presents an alternative embodiment of the plug-in connection 1 according to the invention, wherein only the differences will be touched upon below. As opposed to the embodiment discussed above, the threaded-connection body 3 itself is here shaped in such a way as to form a contact surface 16 for the gasket 13 and fixing ring 15 in the form of a connection piece 20. By comparison to the embodiment taken up previously, then, a part, specifically the intermediate ring, is economized, so that a more compact arrangement can be achieved.

Figure 6:
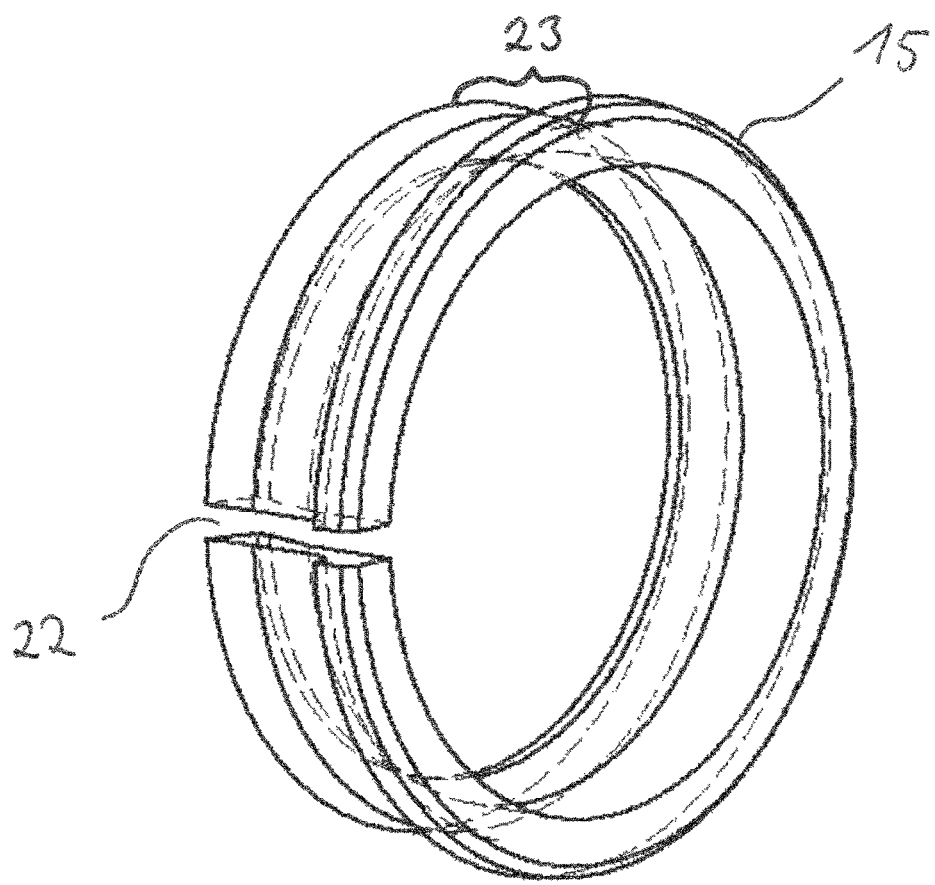
FIG. 6: is a fixing ring.

FIG. 6 depicts a fixing ring 15 that exhibits a slit 22. The slit runs parallel to a longitudinal axis 17 of the plug-in connection 1, and runs over the entire width 23 of the fixing ring 15. In an embodiment not shown, the slit 22 could also run only over a portion of the width 23 of the fixing ring 15.

The present invention can produce a backlash-free, wear-reducing plug-in connection, without a person establishing the connection having to execute an additional assembly step.

REFERENCE LIST

1 Plug-in connection
2 Borehole
3 Threaded-connection body
4 Union nut
5 Pipe piece
6 Retaining surface
7 Securing ring
8 Chamber
9 Floor surface
10 Recess
11 First step
12 Second step
13 Sealing ring
14 Insertion direction
15 Fixing ring
16 Contact surface
17 Longitudinal axis
18 Angle
19 Intermediate ring
20 Connection piece
21 Bead
22 Slit
23 Width

The invention claimed is:

1. A plug-in connection for at least one pipe line or hose line, the plug-in connection comprising:
a threaded-connection body having a borehole for relaying a medium flowing through the at least one pipe line or hose line;
a union nut screwed onto the threaded-connection body;
a pipe piece insertable into the threaded-connection body in an insertion direction to be retained by the union nut, the pipe piece having a retaining surface and being moveable between an inserted position and a locked position;
a securing ring that is supported against the retaining surface, wherein the union nut, the threaded-connection body and the pipe piece define a chamber in which the securing ring is located, the chamber bounded by the union nut, the threaded-connection body and the pipe piece;
a gasket arranged in the chamber for sealing the pipe piece against the threaded-connection body; and
a fixing ring arranged in the chamber between the securing ring and the gasket, the fixing ring being supported between the inserted pipe piece and a contact surface formed on the threaded-connection body and/or the union nut,
wherein the union nut has two stepped recesses for holding the securing ring, the two stepped recesses including a first step that is adjacent to the chamber and accommodates the securing ring when the pipe piece is in the inserted position, and a second step adjoining the first step that accommodates the securing ring when the pipe piece is in the locked position,
wherein the pipe piece is movable from the inserted position to the locked position in a direction opposite the insertion direction by pressurizing the medium,
wherein the contact surface formed on the threaded-connection body and/or the union nut is inclined with an axial progression in a direction of the securing ring relative to a longitudinal axis of the pipe piece, and
wherein the fixing ring is displaced into a fixed position by the gasket when the pipe piece moves to the locked position, the fixing ring being clamped between the contact surface and the pipe piece so that the pipe piece is fixed in the locked position thereby preventing backlash in the plug-in connection.

2. The plug-in connection according to claim 1, wherein the contact surface is inclined by an angle of less than 10° relative to the longitudinal axis of the pipe piece.

3. The plug-in connection according to claim 1, wherein the contact surface is formed on the union nut.

4. The plug-in connection according to claim 3, wherein an axial boundary surface of the first step of the two stepped recesses is inclined against the insertion direction and forms the contact surface.

5. The plug-in connection according to claim 1, wherein the contact surface is formed on an intermediate ring that is situated in the chamber and supported between the threaded-connection body and union nut, or on a connection piece formed on the threaded-connection body.

6. The plug-in connection according to claim 1, wherein the fixing ring is Z-shaped in an axial cross section of the fixing ring, so that the fixing ring abuts in an axial direction against an intermediate ring situated in the chamber or against a connection piece formed on the threaded-connection body, and the fixing ring abuts in an axial direction against a bead on the pipe piece.

7. The plug-in connection according to claim 1, wherein the fixing ring abuts against a bead of the pipe piece in the inserted position and in the locked position.

8. The plug-in connection according to claim 1, wherein the fixing ring has at least one slit aligned parallel to the longitudinal axis.

9. A plug-in connection for pipe lines or hose lines, the plug-in connection comprising:
a threaded-connection body having a borehole for relaying a medium flowing through the pipe line or hose line;
a union nut screwed onto the threaded-connection body;

a pipe piece that is insertable into the threaded-connection body in an insertion direction to be retained by the union nut, the pipe piece having a retaining surface and being moveable between an inserted position and a locked position;

a securing ring that is supported against the retaining surface, wherein the union nut, the threaded-connection body and the pipe piece define a chamber in which the securing ring is located, the chamber bounded by the union nut, the threaded-connection body and the pipe piece;

a gasket arranged in the chamber for sealing the pipe piece against the threaded-connection body; and a fixing ring arranged in the chamber between the securing ring and the gasket, the fixing ring being supported between the inserted pipe piece and a contact surface formed on the threaded-connection body and/or the union nut, wherein the union nut has two stepped recesses for holding the securing ring, the two stepped recesses including a first step that is adjacent to the chamber and accommodates the securing ring when the pipe piece is in the inserted position, and a second step adjoining the first step that accommodates the securing ring when the pipe piece is in the locked position, wherein the pipe piece is moveable from the inserted position to the locked position in the direction opposite the insertion direction by pressurizing the medium in a direction opposite the insertion direction, wherein the contact surface formed on the threaded-connection body and/or the union nut is inclined with an axial progression in a direction of the securing ring relative to a longitudinal axis of the pipe piece, wherein the fixing ring is displaced into a fixed position by the gasket when the pipe piece moves to the locked position, the fixing ring being clamped between the contact surface and the pipe piece so that the pipe piece is fixed in in the locked position thereby preventing backlash in the plug-in connection, and wherein the fixing ring is Z-shaped in an axial cross section of the fixing ring, so that the fixing ring abuts in an axial direction against an intermediate ring situated in the chamber or against a connection piece formed on the threaded-connection body, and the fixing ring abuts in an axial direction against a bead on the pipe piece.

10. The plug-in connection according to claim 9, wherein the contact surface is inclined by an angle of less than 10° relative to the longitudinal axis of the pipe piece.

11. The plug-in connection according to claim 9, wherein the contact surface is formed in the union nut.

12. The plug-in connection according to claim 9, wherein an axial boundary surface of the first step of the two stepped recesses is inclined against the insertion direction and forms the contact surface.

13. The plug-in connection according to claim 9, wherein the contact surface is formed on an intermediate ring that is situated in the chamber and supported between the threaded-connection body and union nut, or on a connection piece formed on the threaded-connection body.

14. The plug-in connection according to claim 9, wherein the fixing ring abuts against a bead of the pipe piece in the inserted position and in the locked position.

15. The plug-in connection according to claim 9, wherein the fixing ring has at least one slit aligned parallel to the longitudinal axis.

* * * * *